Feb. 5, 1952 P. L. SPENCER 2,584,509
RADIO OBJECT-LOCATING SYSTEM
Filed Jan. 22, 1949
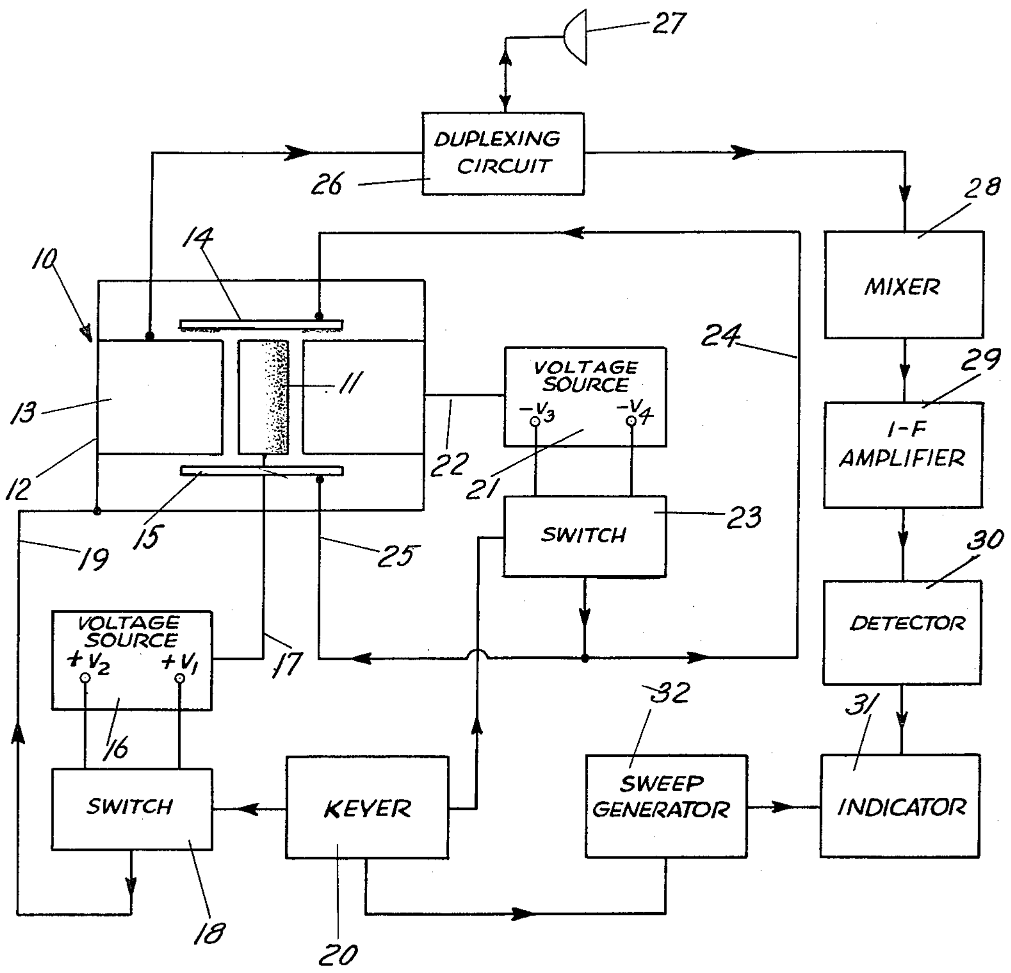
INVENTOR
PERCY L. SPENCER
BY Elmer J. Gorn
ATTORNEY Patented Feb. 5, 1952 2,584,509

UNITED STATES PATENT OFFICE 2,584,509

RADIO OBJECT-LOCATING SYSTEM

Percy L. Spencer, West Newton, Mass., assignor to Raytheon Manufacturing Company, Newton, Mass., a corporation of Delaware Application January 22, 1949, Serial No. 72,167

5 Claims. (Cl. 343—5)

This invention relates to radio object-locating systems, for example, of the so-called pulse-echo type, operating in the microwave region of the electromagnetic spectrum.

In systems of the general character above referred to, exploratory pulses of electromagnetic energy are periodically radiated into space, generally at an audio-frequency rate, and upon such energy encountering an object in said space, a portion thereof suffers reflection. The reflected energy, known as an echo, is received back at the site of the transmitting installation and the time intervening between the original transmission and the reception of the echo thereof is utilized to determine the distance to the reflecting object.

The transmitter and receiver usually share a common antenna, means, known as a duplexing circuit, being provided to protect the receiver from the high power of the transmitter during the transmitting periods. The receiver is usually of the superheterodyned type and includes a local oscillator for generating oscillations, preferably, of a frequency higher than that of the transmitted energy, which oscillations are mixed in a first detector with the incoming echo signals to derive an intermediate-frequency signal. The latter, after amplification, is demodulated in a second detector, and the resulting pulses are applied to an indicator, such as a cathode-ray tube, to which there is also applied, in synchronism with the pulse transmission, a timing wave, all in a manner well known to those skilled in the art to which the present invention relates.

A system such as has been described possesses certain disadvantages. It necessitates the incorporation of a separate local oscillator, which adds to the cost thereof. In addition, the local oscillator must have its frequency maintained at a proper point with respect to the frequency of the transmitter in order that the intermediate-frequency amplifier, which is ordinarily of the fixed tuned type, accept the signal fed thereto from the first detector. The attainment of this condition requires the use of costly frequency stabilizing apparatus.

It is, therefore, among the objects of the present invention to provide a radio object-locating system which avoids the necessity for a separate local oscillator, thereby materially reducing the cost of the system as a whole.

It is a further object of the present invention to provide a radio object-locating system which utilizes the source of the exploratory energy itself as a local oscillator, whereby costly frequency-stabilizing circuits are eliminated and any tendency of said source to drift in frequency has no effect upon the intermediate-frequency signal developed in the receiver.

These, and other objects of the present invention, which will become more apparent as the detailed description thereof progresses, are attained, briefly, in the following manner.

Suitable means for generating electromagnetic energy in the microwave region of the spectrum, for example, a magnetron oscillator, is coupled, through a duplexing circuit, to an appropriate microwave antenna system. This oscillator is provided with means for controlling the frequency of the energy generated thereby. Suitable potentials are applied to the oscillator and the frequency-controlling means thereof to energize said oscillator into operation at a predetermined, relatively high frequency and relatively low power level. The oscillations thus generated are applied, also through the duplexing circuit, to the first detector of the receiver and constitute local oscillator energy for combination with incoming echo signals to derive an intermediate-frequency signal. Periodically, other suitable potentials are applied to the oscillator and to the frequency-controlling circuit thereof to pulse said oscillator into operation at a different, relatively lower frequency and a relatively high power level. The oscillations thus generated constitute the exploratory pulses which are radiated into space and prevented by the duplexing circuit from entering the receiver.

Thus, between the radiated exploratory pulses, the first detector is supplied with local oscillations which, upon mixing with the received echo signals, result in an intermediate-frequency signal which is of constant frequency regardless of any drift in the oscillator frequency.

In the accompanying specification there shall be described, and in the annexed drawing shown, an illustrative embodiment of the radio object-locating system of the present invention. It is, however, to be clearly understood that the present invention is not to be limited to the details herein shown and described for purposes of illustration only, inasmuch as changes therein may be made without the exercise of invention, and within the true spirit and scope of the claims hereto appended.

In said drawing, the single figure is a block diagram of a radio object-locating system assembled in accordance with the principles of the present invention.

Referring now more in detail to the aforesaid illustrative embodiment of the present invention, with particular reference to the drawing illustrating the same, the numeral 10 schematically designates a microwave oscillator, for example, of the multiple-cavity magnetron type.

Such an oscillator may include a centrally disposed cathode 11 surrounded by a cylindrical anode body 12 which is provided with a plurality of interiorly-extending, radially-disposed anode arms 13, each pair of adjacent arms, together with those portions of said cylindrical anode body lying therebetween, constituting a cavity resonator. Means (not shown in the interest of simplicity) are conventionally provided to establish a magnetic field in the interelectrode space of the device, said field extending in a direction transverse to the electron path between the cathode 11 and anode arms 13. When the cathode of such a device is caused to become electron emissive, as by appropriately heating the same by an electric current, and a suitable potential difference is established between said cathode and the anode, such a device generates electrical oscillations in the cavity resonators thereof, the frequency of said oscillations being determined, primarily, by the geometry of the physical elements making up such cavity resonators.

It has been found that the natural resonant frequency of such a device can be altered by injecting electrons into the cavity resonators thereof, particularly, in the high capacitance regions of such resonators, said electrons altering the dielectric constant of said resonators, and hence, the capacitance thereof, thereby altering the frequency of oscillation. In order to accomplish this frequency deviation, the device may be provided at the opposite open ends of the cavity resonators with a pair of annular electrodes 14 and 15, one of said electrodes, for example, the electrode 14, being thermionically emissive, and the remaining electrode constituting an electron-reflecting element. These electrodes are maintained at a suitable negative potential with respect to the anode body 12 whereby the electrons emitted by the electrode 14 are accelerated toward said anode body, many of them passing downwardly through the cavity resonators and coming under the influence of the field between the reflecting electrode 15 and the anode body 12. The reflecting electrode 15 causes these electrons to move back through the cavity resonators toward the primary emitting electrode 14 by which they are again reflected. Some of the electrons which approach the reflecting electrode 15 have sufficient velocity to bombard said electrode and bring about secondary electron emission therefrom. In any event, a particular potential difference between the electrodes 14 and 15 and the anode body 12 provides a certain electron population in the cavity resonators and thereby fixes the operating frequency of the device. Alternation of this potential difference alters said electron population and changes said operating frequency. Thus, the device can be frequency modulated by control of the voltage applied between the electrodes 14 and 15 and the anode body 12.

For a more complete description of a frequency-modulated magnetron, such as has been briefly described above, attention is directed to an application of William C. Brown, Serial No. 655,445, filed March 19, 1946, Patent No. 2,556,747, granted June 12, 1951, entitled Electron Discharge Device.

In the system of the present invention a voltage source 16 is provided having a relatively low positive voltage output $V_1$ and a relatively high positive voltage output $V_2$. The negative terminal of this voltage source is connected by a conductor 17 to the cathode 11 of the magnetron 10, and one or the other of the positive potentials $V_1$ or $V_2$ is applied, through a suitable switch 18 and a conductor 19, to the anode body 12 of said magnetron. The switch 18 may be under the control of a keyer 20 such as is usually employed for triggering the oscillator and the cathode-ray tube timing-wave generator of a conventional pulse-echo radar system.

In the system of the present invention, there is also provided a second voltage source 21 having a relatively low negative voltage output $V_3$ and a relatively high negative voltage output $V_4$. The positive terminal of this voltage source is connected by a conductor 22 to the anode body 12 of the magnetron 10, and one or the other of the negative potentials $V_3$ or $V_4$ is applied, through a suitable switch 23 and conductors 24 and 25, to the emitting and reflecting electrodes 14 and 15. The switch 23 may be similar to the switch 18 and, preferably, is also under the control of the keyer 20.

The switching arrangement is preferably such that when the relatively low positive voltage $V_1$ is being applied between the cathode 11 and anode body 12 of the magnetron, the relatively low negative voltage $V_3$ is being applied between the electrodes 14 and 15 and said anode body 12. Under these conditions, the magnetron oscillates at a relatively low power level and, because the electron population in the cavity resonators is relatively rare, at a relatively high frequency. If now the relatively high positive voltage $V_2$ and the relatively high negative voltage $V_4$ are connected, respectively, to the cathode-anode circuit 11—12 and the electrode-anode circuit 14—15—12, the magnetron will oscillate at a relatively high power level and, because the electron population in the cavity resonators is relatively dense, at a relatively lower frequency.

The output of the magnetron is applied, through a suitable duplexing circuit 26, to a microwave antenna system 27 and to a first detector or mixer 28, the arrangement being such that when the magnetron is operating at its relatively low power level and its relatively high frequency, the duplexing circuit does not break down and most of the generated energy is applied to the mixer, but when the magnetron is pulsed into operation at its relatively high power level and its relatively lower frequency, said duplexing circuit does break down, the input to the mixer becomes substantially short-circuited, and most of the generated energy is applied to the antenna system 27 for radiation into space.

As stated in earlier portions of this specification, when the exploratory pulses thus projected into space encounter a reflecting object, a portion of the energy thereof is reflected and eventually received by the antenna system 27. During the receiving periods intervening the exploratory pulses, the mixer 28 is being supplied with the relatively low power, relatively high-frequency output of the magnetron, and when this energy combines with the received echo signals in said mixer 28, an intermediate-frequency signal is obtained, the frequency of which is, preferably, the difference between the two frequencies generated by the magnetron as above described. The intermediate-frequency signal is applied to an amplifier 29 and the output of the latter is demodulated in a second detector 30. The pulses thus obtained are applied to an indicator 31 which may be a cathode-ray tube of the A-scope, plan-position-indicating, or any other type. The indicator 31 may be provided with a suitable timing wave by a sweep voltage generator 32 operating under the control of the keyer 20 in synchronism with the pulsing of the magnetron 10.

This completes the description of the aforesaid illustrative embodiment of the present invention. It will be noted from all of the foregoing that there has been provided a pulse-echo radar system in which a single source of oscillating energy is utilized to produce the radiated exploratory pulses, and the local oscillations for developing the intermediate-frequency signal in the receiver, thereby eliminating the necessity for a separate local oscillator, reducing the cost of the system as a whole, and avoiding the frequency-stabilizing circuits generally required in systems having separate local oscillators.

Other objects and advantages of the present invention will readily occur to those skilled in the art to which the same relates.

What is claimed is:

1. A transmitter for a radio object-locating system comprising: an oscillator adapted to generate electromagnetic energy; means for controlling the frequency of the energy adapted to be generated by said oscillator; a plurality of voltage sources of different magnitudes; means for connecting some of said voltage sources to said oscillator and said frequency-controlling means to energize said oscillator into operation at a predetermined frequency and a predetermined power level; and means for connecting others of said voltage sources to said oscillator and said frequency-controlling means to energize the same into operation at a different frequency and a different power level.

2. A transmitter for a radio object-locating system comprising: an oscillator adapted to generate electromagnetic energy; means for controlling the frequency of the energy adapted to be generated by said oscillator; a plurality of relatively low and relatively high voltage sources; means for connecting said relatively low voltage sources to said oscillator and said frequency-controlling means to energize said oscillator into operation at a relatively high frequency and a relatively low power level; and means for connecting said relatively high voltage sources to said oscillator and said frequency-controlling means to energize the same into operation at a relatively low frequency and a relatively high power level.

3. A radio object-locating system comprising: an oscillator adapted to generate electromagnetic energy; means for controlling the frequency of the energy adapted to be generated by said oscillator; a plurality of voltage sources of different magnitudes; means for connecting some of said voltage sources to said oscillator and said frequency-controlling means to energize said oscillator into operation at a predetermined frequency and a predetermined power level; means for connecting others of said voltage sources to said oscillator and said frequency-controlling means to energize the same into operation at a different frequency and a different power level; said two last-named means being alternately operable; means for radiating electromagnetic energy into space and receiving portions thereof reflected from objects to be located therein; a beat-frequency detector; and means, coupled to said oscillator, said radiating-receiving means, and said detector, for directing the major portion of the energy generated at one of said frequencies and power levels to said radiating-receiving means, and at another of said frequencies and power levels to said detector.

4. A radio object-locating system comprising: an oscillator adapted to generate electromagnetic energy; means for controlling the frequency of the energy adapted to be generated by said oscillator; a plurality of relatively low and relatively high voltage sources; means for connecting said relatively low voltage sources to said oscillator and said frequency-controlling means to energize said oscillator into operation at a relatively high frequency and a relatively low power level; means for connecting said relatively high voltage sources to said oscillator and said frequency-controlling means to energize the same into operation at a relatively low frequency and a relatively high power level; said two last-named means being alternately operable; means for radiating electromagnetic energy into space and receiving portions thereof reflected from objects to be located therein; a beat-frequency detector; and means, coupled to said oscillator, said radiating-receiving means, and said detector, for directing the major portion of the energy generated at the lower frequency and higher power level to said radiating-receiving means, and at the higher frequency and lower power level to said detector.

5. A transmitter for a radio object-locating system comprising: a magnetron oscillator of the cavity resonator type; means for energizing said oscillator to generate electromagnetic energy of predetermined power; electronic tuning means for adjusting the frequency of the energy thus generated; and means coupled to said energizing and tuning means for controlling the same to simultaneously alter the power level and frequency of said energy.

PERCY L. SPENCER.

REFERENCES CITED

The following references are of record in the file of this patent:

UNITED STATES PATENTS

| Number | Name | Date |
|---|---|---|
| 2,423,024 | Hershberger | June 24, 1947 |
| 2,424,854 | Sanders | July 29, 1947 |
| 2,427,191 | Brink | Sept. 9, 1947 |
| 2,433,669 | Keister | Dec. 30, 1947 |
| 2,444,388 | De Vries | June 29, 1948 |
| 2,451,141 | Wolff | Oct. 12, 1948 |
| 2,523,684 | Dow | Sept. 26, 1950 |